United States Patent
Tsutsumi et al.

(10) Patent No.: US 7,884,577 B2
(45) Date of Patent: Feb. 8, 2011

(54) APPARATUS FOR CONTROLLING TEMPERATURE OF SECONDARY BATTERY, VEHICLE BATTERY PACK, AND SYSTEM AND PROGRAM FOR HEATING SECONDARY BATTERY

(75) Inventors: Masateru Tsutsumi, Toyohashi (JP); Takuma Iida, Kadoma (JP); Yasushi Matsukawa, Toyohashi (JP); Yasuyuki Hori, Toyohashi (JP)

(73) Assignee: Panasonic EV Energy Co., Ltd., Kosai-shi (JP)

( * ) Notice: Subject to any disclaimer, the term of this patent is extended or adjusted under 35 U.S.C. 154(b) by 811 days.

(21) Appl. No.: 11/714,415

(22) Filed: Mar. 5, 2007

(65) Prior Publication Data
US 2007/0210769 A1 Sep. 13, 2007

(30) Foreign Application Priority Data
Mar. 7, 2006 (JP) ............................. 2006-060684

(51) Int. Cl.
*H02J 7/04* (2006.01)
*H02J 7/16* (2006.01)
(52) U.S. Cl. ........................ 320/150; 320/148; 320/156; 320/161; 429/62; 429/120
(58) Field of Classification Search ................. 320/150
See application file for complete search history.

(56) References Cited

U.S. PATENT DOCUMENTS

| | | | |
|---|---|---|---|
| 5,497,068 A | * | 3/1996 | Shiojima .................... 320/150 |
| 5,504,415 A | * | 4/1996 | Podrazhansky et al. ..... 320/118 |
| 6,501,250 B2 | | 12/2002 | Bito et al. |

FOREIGN PATENT DOCUMENTS

JP 2001314039 A 11/2001
JP 2004336832 A 11/2004

* cited by examiner

*Primary Examiner*—Edward Tso
*Assistant Examiner*—Arun Williams
(74) *Attorney, Agent, or Firm*—Christensen O'Connor Johnson Kindness PLLC (57) ABSTRACT

An apparatus, which controls the temperature of a secondary battery formed by combination of a plurality of single cells or a plurality of battery modules each made by series connection of multiple single cells, prevents variations in the temperature or voltage of the single cells or the battery modules, which could otherwise be caused when the secondary battery is heated. A temperature control section controls the quantity of heat by means of which a heater heats a secondary battery formed by combination of a plurality of battery modules made by series connection of multiple single cells. The temperature control section detects a rate of temporal changes in an open circuit voltage of the secondary battery. When a detected rate of temporal changes in open circuit voltage has exceeded a predetermined threshold voltage value, the heater is controlled to thus diminish the quantity of heat used for heating the secondary battery.

8 Claims, 5 Drawing Sheets

APPARATUS FOR CONTROLLING TEMPERATURE OF SECONDARY BATTERY, VEHICLE BATTERY PACK, AND SYSTEM AND PROGRAM FOR HEATING SECONDARY BATTERY

PRIORITY INFORMATION

This application claims priority to Japanese Patent Application No. 2006-60684 filed on Mar. 7, 2006, which is incorporated herein by reference in its entirety.

BACKGROUND OF THE INVENTION

1. Field of the Invention

The present invention relates to a technique for controlling the temperature of a secondary battery formed by combination of a plurality of cells or by a plurality of battery modules in which a plurality of cells are connected in series.

2. Related Art

There has hither to been put forward a technique for heating or warming a battery in order to prevent a decrease in the performance of the battery, which would otherwise arise at low temperature. For instance, proposed in Japanese Patent Laid-Open Publication No. 2001-314039 is a secondary battery input-and-output controller which recharges a battery mounted in a hybrid electric vehicle (hereinafter called a "hybrid vehicle") through use of regenerated energy, there by increasing the temperature of the battery. By means of this input-and-output controller, the battery at low temperature is heated by the heat of recharging reaction of the battery produced as a result of the recharged state ("State Of Charge" and hereinafter abbreviated as "SOC") of the battery being subjected to recharging-and-discharging control in a region of low recharging efficiency.

The input-and-output controller described in Japanese Patent Laid-Open Publication No. 2001-314039 heats the battery by the heat of recharging action induced by the energy regenerated during travel. Accordingly, when the vehicle is stationary, the battery cannot be heated. Therefore, when the engine is inactive, there is a chance of the temperature of the battery being lowered by outside air. A decrease in SOC may pose difficulty in cranking (starting the engine), which would otherwise be induced by the power discharged by the battery.

Meanwhile, put forth in Japanese Patent Laid-Open Publication No. 2004-336832 is a battery temperature controller for detecting an SOC of a battery and the temperature of outside air and heating the battery during stoppage of driving operation of a vehicle by use of power from the battery when the SOC of the battery is greater than a predetermined SOC level and the temperature of outside air is lower than a predetermined temperature. The temperature controller described in this patent publication prevents a drop in the temperature of the battery, which would otherwise arise after deactivation of the engine, to thus ensure the ease of activation of the engine.

Incidentally, in many cases, a secondary battery formed by combination of a plurality of single cells or by a plurality of battery modules, each of which is made by connecting a lot of single cells in series, is used for a battery to be mounted in a hybrid vehicle, such as that mentioned above. When the secondary battery structured as mentioned above is heated through use of the controller described in Japanese Patent Laid-Open Publication No. 2001-314039, the controller described in Japanese Patent Laid-Open Publication No. 2004-336832, or another heating means, there may arise a case where variations occur in the plurality of single cells or the plurality of battery modules, which constitute the secondary battery, in terms of a battery temperature and by extension a battery voltage, because of heating characteristics of the heating means or the structure of the secondary battery. Since the single cells or the battery modules are connected in series within the secondary battery such that a desired high voltage is achieved, those variations may sometimes result in deterioration of the secondary battery as a result of appearance of excessively-discharged single cells or battery modules, and as well may cause a drop-off in the performance of the secondary battery.

SUMMARY OF THE INVENTION

Accordingly, the present invention prevents occurrence of variations in the battery temperature or voltage of battery modules, which could otherwise arise as a result of heating of a secondary battery, through use of a secondary battery temperature controller built from a combination of a plurality of battery modules.

A temperature controller of the present invention is characterized by comprising:

a voltage change rate detection section for detecting a rate of temporal changes in an open circuit voltage of a secondary battery formed from a combination of a plurality of battery modules; and a heat quantity control section for diminishing a quantity of heat used for heating the secondary battery by means of controlling a heater when the rate of temporal changes in open circuit voltage has exceeded a predetermined threshold value for a voltage.

In one mode of the present invention, the voltage change rate detection section detects a rate of temporal changes in open circuit voltage per at least one of a plurality of battery modules; and the heat quantity control section reduces the quantity of heat when at least one of a plurality of detected rates of temporal changes in open circuit voltages has exceeded the threshold value for a voltage.

In one mode of the present invention, the heat quantity control section aborts heating of the secondary battery performed by the heater when the rate of temporal change in open circuit voltage has exceeded a predetermined threshold value for a voltage.

In one mode of the present invention, the heat quantity control section diminishes the quantity of heat stepwise until the rate of temporal change in open circuit voltage becomes lower than a predetermined threshold value for a voltage.

A temperature controller of the present invention is characterized by comprising:

a temperature change rate detection section for detecting a rate of temporal change in a temperature of a secondary battery formed by a combination of a plurality of battery modules; and a heat quantity control section for diminishing a quantity of heat used for heating the secondary battery by means of controlling a heater when the rate of temporal change in the temperature of the battery has exceeded a predetermined threshold value for a temperature.

In one mode of the present invention, the temperature change rate detection section detects rates of temporal temperature changes acquired at a plurality of positions on the secondary battery; and the heat quantity control section reduces the quantity of heat when at least one of a plurality of detected rates of temporal changes in temperatures has exceeded the threshold value for a temperature.

In one mode of the present invention, the heat quantity control section diminishes the quantity of heat regardless of the rate of temporal changes when the lowest temperature among detected temperatures has become lower than a predetermined reference lower-limit temperature or when the highest temperature has exceeded a predetermined reference upper-limit temperature.

Moreover, in one mode of the present invention, the heat quantity control section aborts heating of the secondary battery performed by the heater when the rate of temporal change in the temperature of the battery has exceeded a predetermined threshold value for a temperature.

In addition, in one mode of the present invention, the heat quantity control section diminishes the quantity of heat stepwise until the rate of temporal change in the temperature of the battery becomes lower than a predetermined threshold value for a temperature.

A vehicle battery pack of the present invention is equipped with any one of the temperature controllers set forth.

In one mode of the vehicle battery pack of the present invention, when the temperature of the secondary battery is lower than a predetermined reference lower-limit temperature at startup of the vehicle, the temperature controller enables startup of a vehicle by heating the heater until the temperature reaches at least the reference lower-limit temperature.

A heating system of the present invention is characterized by comprising:

a heating section for heating a secondary battery formed from combination of a plurality of battery modules;

a temperature detection section for detecting a temperature of the secondary battery;

a voltage change detection section for detecting the change in open circuit voltage of the secondary battery within a predetermined period of time; and a heat quantity control section for activating the heating section when a temperature detected by the temperature detection section is a predetermined reference lower-limit temperature or less and for suppressing heating operation of the heating section when the voltage change exceeds an allowable value in accordance with the voltage change detected by the voltage change detection section after the heating section has performed heating.

In one mode of the present invention, the voltage change detection section is for detecting, every group of battery modules, the change in open circuit voltage within a predetermined period of time; and the heat quantity control section suppresses and controls heating operation of the heating section when any of the voltage changes detected every group of battery modules exceeds the allowable value.

Moreover, in one mode of the present invention, the heat quantity control section stops heating operation of the heating section without regard to a relationship between the temperature and the reference lower-limit temperature when the voltage change exceeds the allowable value.

Further, in one mode of the present invention, when the voltage change does not exceed the allowable value, the heat quantity control section stops heating operation of the heating section when the temperature does not fall in excess of the reference lower-limit temperature after elapse of a predetermined period of time after heating operation of the heating section.

A heating system of the present invention is characterized by comprising:

a heating section for heating a secondary battery formed from combination of a plurality of battery modules;

a temperature detection section for detecting a temperature of the secondary battery; and a heat quantity control section for the heating section to operate when the temperature detected by the temperature detection section is lower than or equal to a predetermined reference lower-limit temperature and suppressing heating operation of the heating section when the temperature change exceeds an allowable value according to the temperature change within a predetermined period of time after heating operation of the heating section.

In one mode of the present invention, the temperature detection section detects temperatures of the plurality of battery modules; and the heat quantity control section for controlling and suppressing heating operation of the heating section when any of the temperature changes in the plurality of battery modules exceeds the allowable value.

Moreover, in one mode of the present invention, the heat quantity control section stops heating operation of the heating section regardless of a relationship between the temperature and the reference lower-limit value when the temperature change exceeds the allowable value.

Further, in one mode of the present invention, the heat quantity control section stops heating operation of the heating section when the temperature change does not exceed the allowable value and when the temperature does not fall in excess of the reference lower-limit temperature after elapse of a predetermined period of time after heating of the heating section.

According to the present invention, an apparatus for controlling the temperature of a secondary battery formed by combination of a plurality of battery modules monitors a rate of temporal voltage or temperature changes induced by heating. When an anomaly has arisen in the rate of change, a heater or the like is deemed to have caused an anomaly, and heating operation is suppressed. As a result, temperature or voltage variations in the battery modules, which could otherwise be caused by heating of the secondary battery, can be suppressed. Thus, there can be prevented a progress in deterioration of the secondary battery, which would otherwise be caused when some of the groups of battery modules constituting the secondary battery become excessively discharged for reasons of temperature or voltage variations in the battery modules.

The invention will be more clearly comprehended by reference to the embodiment provided below. However, the scope of the invention is not limited to the embodiment.

BRIEF DESCRIPTION OF THE DRAWINGS

A preferred embodiment of the present invention will be described in detail based on the following figures, wherein.

DETAILED DESCRIPTION OF THE PREFERRED EMBODIMENT

A best mode (hereinafter called an "embodiment") for implementing the present invention will be described hereinbelow by reference to the drawings.

The present embodiment describes, by way of an example, a case where a secondary battery formed by combination of a plurality of battery modules, each of which is formed by connecting multiple single cells in series, is used as a power source of a drive motor mounted in a hybrid vehicle. A technique for controlling the temperature of a secondary battery to be described hereunder can also be applied to an electric vehicle other than a hybrid vehicle having a motor as a drive source and another apparatus equipped with a secondary battery formed by combination of a plurality of battery modules, each of which is formed by connecting multiple single cells in series. The battery module described herein also includes a battery made up of a single cell.

Figure 1:
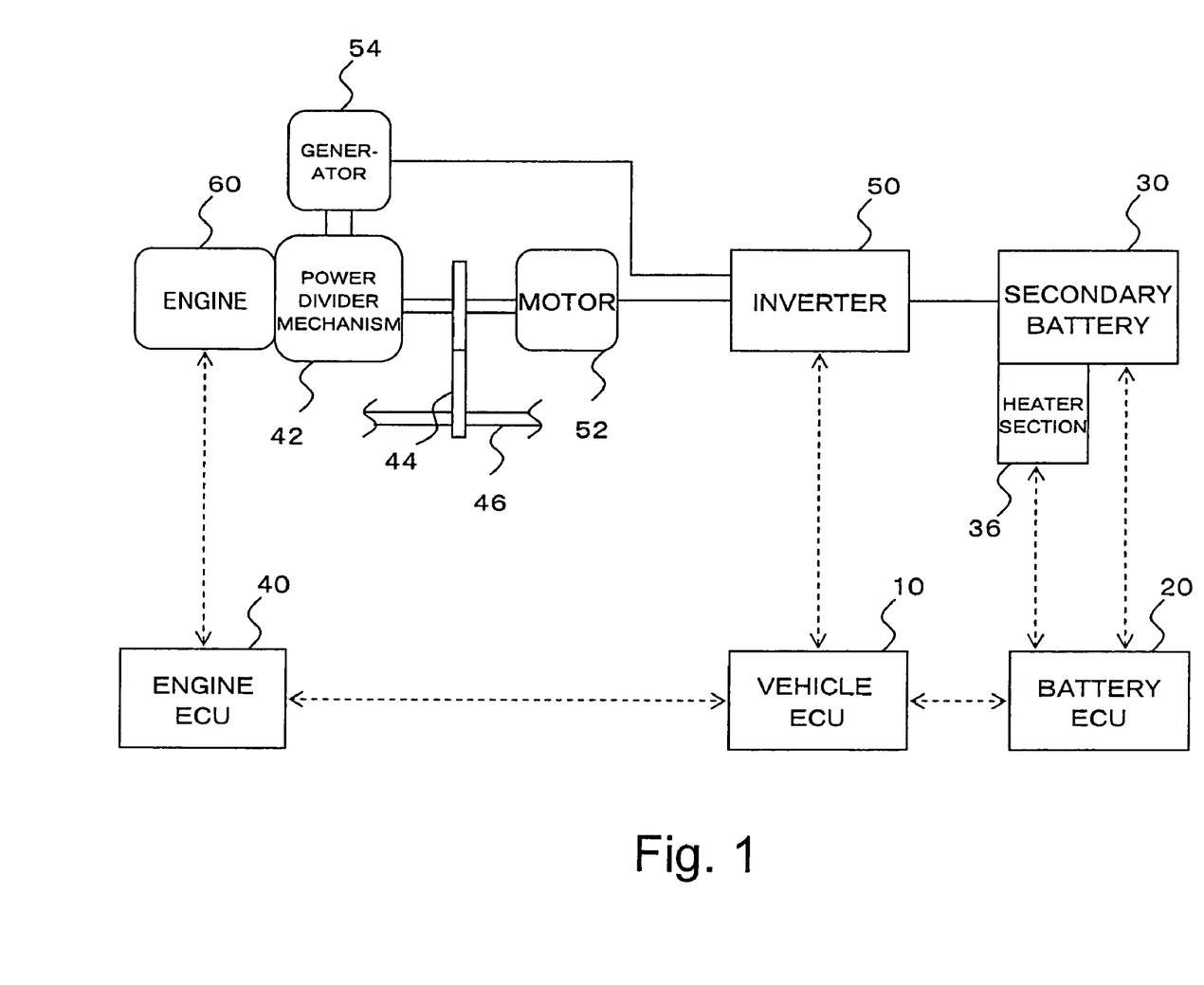
FIG. 1 is a view showing the general configuration of a hybrid vehicle of an embodiment of the present invention.

FIG. 1 a view showing the general configuration of a hybrid vehicle of the embodiment. In FIG. 1, a vehicle ECU 10 controls an inverter 50 and an engine electronic control unit (hereinafter called an "engine ECU") 40. The engine ECU 40 controls an engine 60. Moreover, a battery electronic control unit (hereinafter abbreviated as a "battery ECU") 20 estimates an SOC of a secondary battery 30 upon receipt of information about the voltage of the battery, the temperature of the same, and the like, from the secondary battery 30; and transmits to the vehicle ECU 10 the thus-estimated SOC and the information about the voltage of the battery, the temperature of the same, and the like. The battery ECU 20 also controls a heater (an example heating section) 36 which will be described later.

Figure 2:
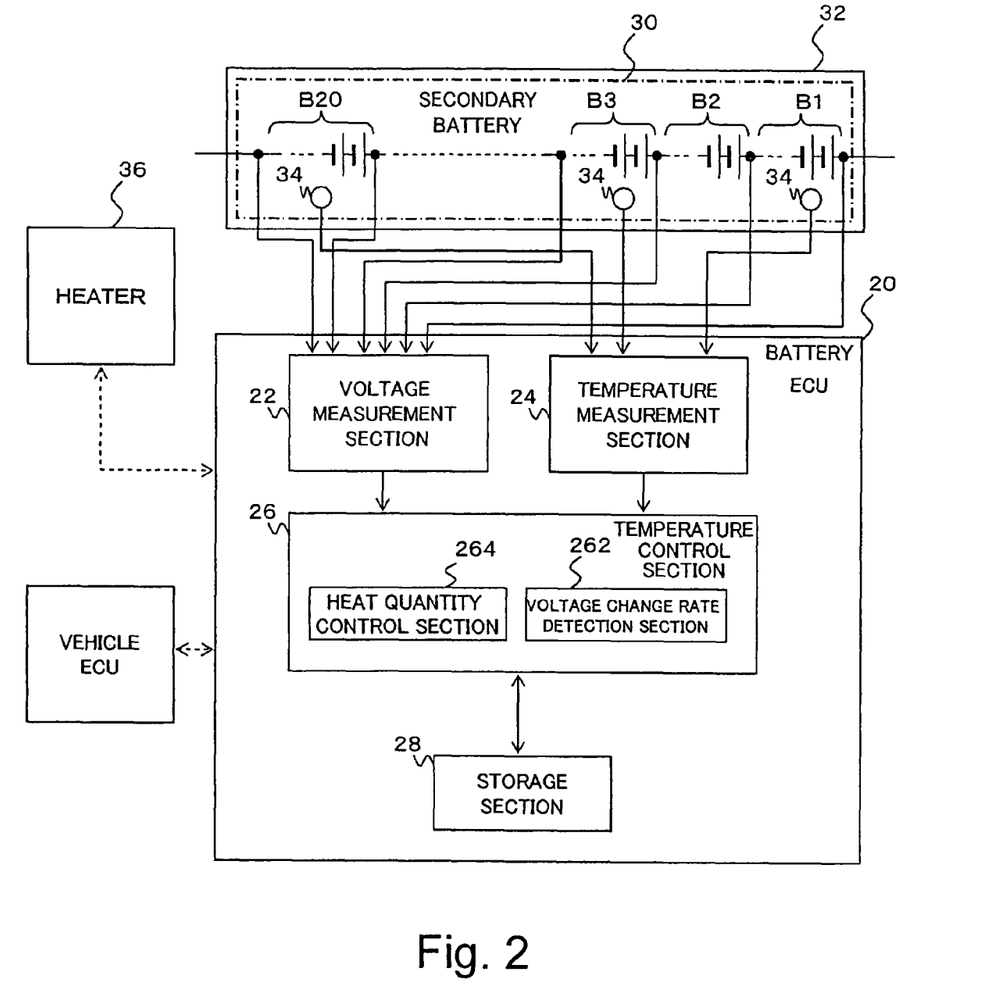
FIG. 2 is a view showing a functional block for describing the configuration of a battery ECU (Electronic Control Unit) employed when a temperature control section determines variations in the temperature of a battery from a rate of temporal voltage changes.

As shown in FIG. 2, the secondary battery 30 is configured by means of connecting battery blocks B1 to B20 in series. These battery blocks B1 to B20 are housed in a battery case 32. Each of the battery blocks B1 to B20 is formed by means of electrically connecting two battery modules together. Moreover, each of the battery modules is formed by electrically connecting six single cells in series. A nickel-metal hydride battery, a lithium ion battery, or the like can be used as the single cell. No specific limitations are imposed on the number of battery blocks, the number of battery modules, and the number of single cells. Also, the configuration of the secondary battery 30 is not limited to the above-described example, and the essential requirement is that the secondary battery be formed by combination of a plurality of battery modules.

Moreover, a plurality of temperature sensors 34 are provided within the battery case 32. The plurality of temperature sensors 34 are arranged by means of taking a plurality of battery blocks whose temperatures are relatively close to each other as one group or taking a single battery block whose temperature comparatively differs from the temperatures of the other battery blocks as a single group; and placing a single temperature sensor 34 for each group. The battery blocks are grouped by measuring the temperature of each of the battery blocks through a preliminary experiment or the like. In the present embodiment, M (M is an integer) temperature sensors 34 are assumed to be provided. In a case where there is no necessity for distinguishing temperatures T(1) to T(M) measured by the respective temperature sensors 34, the temperature is expressed as Tm.

Turning back to FIG. 1, the heater 36 heats the respective battery modules constituting the secondary battery 30 upon receipt of a command from the battery ECU 20. The heater 36 has, e.g., a heating element disposed so as to contact a bottom surface of the battery module, and causes the heating element to heat the secondary battery 30 with the amount of heat instructed by the battery ECU 20. For instance, a plane heating element having a PTC (Positive Temperature Coefficient) characteristic is used for this heating element. Moreover, the heating element may also be heated by means of an IH (Induction Heating) system.

Further, for instance, hot air heated by an air conditioner equipped in a hybrid vehicle may also be used as the heat source used for heating the heating element. In this case, in order to heat the heating element by means of hot air, the heater 36 has a fan for guiding hot air around the heating element, and a fan drive motor, and the heating element is placed at an inlet or outlet port of the fan. In accordance with the amount of heat instructed by the battery ECU 20, the heater 36 drives the fan drive motor to rotate the fan, thereby guiding the hot air to the heating element.

The heater 36 maybe supplied with power from the secondary battery 30 or from an auxiliary battery which supplies power to accessories such as various ECUs or lights. Moreover, the heater 36 may also be supplied with power from an external power source, such as a commercial power source or the like. When the external power source is utilized, the user must connect the external power source to the heater 36 by means of a cable or the like, in order to heat the secondary battery 30. When the external power source is utilized, the heater 36 itself controls the amount of heat. In short, the heater 36 has a temperature control section 26 which will be described later.

The secondary battery 30 supplies power to a motor 52 via a relay unit (not shown) and the inverter 50. The inverter 50 converts the d.c. current supplied from the secondary battery 30 into an a.c. current used for driving a motor.

The engine 60 transmits power to wheels via a power divider mechanism 42, a reduction gear 44, and a drive shaft 46. The motor 52 transmits power to the wheels via the reduction gear 44 and the drive shaft 46. When the secondary battery 30 needs to be recharged, a portion of power of the engine 60 is supplied to a generator 54 via the power divider mechanism 42 and utilized for recharging.

The vehicle ECU 10 outputs a control command to the engine ECU 40 and the inverter 50 in accordance with information about the driving state of the engine 60 from the engine ECU 40, the amount of actuation of a gas pedal, the amount of actuation of a brake pedal, a shift range set by a shift lever, an SOC from the battery ECU 20, or the like, thereby driving the engine 60 and the motor 52.

As mentioned above, the battery ECU 20 outputs a heating command to the heater 36 so as to heat the secondary battery 30 with a desired amount of heat. More specifically, the battery ECU 20 acquires the temperature Tm of the battery transmitted from the temperature sensor 34. When the temperature Tm is lower than a reference lower-limit temperature Tα required for the secondary battery 30 to exhibit desired recharging-and-discharging capability, a heating command showing a previously-set amount of heat is output to the heater 36.

The heater 36 heats the secondary battery 30 in order to prevent failure of the secondary battery 30 to exhibit desired recharging-and-discharging capability, which would otherwise arise when the secondary battery 30 is recharged or discharged before the temperature Tm reaches the reference lower-limit temperature Tα, or to prevent occurrence of early deterioration of the secondary battery 30. To this end, the battery ECU 20 determines whether or not the heater 36 must heat the secondary battery 30, in accordance with the temperature Tm before the vehicle ECU 10 commences predetermined startup processing upon receipt of a command for starting the engine serving as a drive source, or the like. When the result of the determination shows that heating is required, the vehicle ECU 10 is caused to suspend startup processing until the temperature of the secondary battery 30 reaches a desired temperature. Moreover, as in the case where start-up processing is immediately performed when the engine, or the like, is re-started after elapse of a short period of time after deactivation of the engine, the battery ECU 20 determines whether or not the heater 36 must heat the secondary battery 30, in accordance with the temperature Tm, before the vehicle ECU 10 commences predetermined deactivation processing upon receipt of a command for deactivating the engine, or the like. When the result of the determination shows that heating is required, the battery ECU 20 causes the vehicle ECU 10 to suspend deactivation processing until the temperature of the secondary battery 30 reaches a predetermined temperature.

As mentioned above, if the secondary battery 30 is heated, early deterioration of the secondary battery 30 can be prevented. Meanwhile, as a result of the heater 36 heating the secondary battery 30, there may arise a case where a difference arises in the battery modules constituting the secondary battery 30 in terms of the temperature or voltage of the battery.

Accordingly, in the present embodiment, after having instructed the heater 36 to heat the secondary battery 30, the battery ECU 20 sequentially acquires the temperature Tm and voltage of the secondary battery 30, thereby monitoring the rate of temporal changes in the temperature of the battery modules and the rate of temporal changes in the voltage of the same. In a case where the rate of temporal changes in the temperature of the battery or the rate of temporal changes in the voltage of the battery has exceeded a predetermined threshold value, the battery ECU 20 aborts heating of the secondary battery 30 performed by the heater 36 even when the temperature Tm has not yet reached the reference lower-limit temperature Tα. As mentioned above, when the temperature of the battery or the rate of temporal changes in the voltage of the battery has exceeded a predetermined threshold value, heating of the secondary battery 30 is aborted, thereby preventing spreading of variations in the temperature of the battery or variations in the voltage of the battery. As a result of the secondary battery 30 being left unheated after abortion of heating, variations in the temperature of the battery or variations in the voltage of the battery are diminished by means of convection or conduction of heat among the battery modules. Consequently, according to the present embodiment, there can be prevented a progress in the deterioration of the secondary battery, which would otherwise be caused when, among the group of single cells or the group of battery modules constituting the secondary battery, some single cells or battery modules become excessively discharged for reasons of variations in the temperature of the battery modules or variations in the voltage of the battery modules.

The rate of temporal temperature changes and the rate of temporal voltage changes can be ascertained as physical quantities used for determining whether a heating characteristic is normal or abnormal, without regard to initial values. When the rate of temporal temperature changes or the rate of temporal voltage changes is abnormal in spite of a value of a temperature or a value of a voltage being a normal value, an anomaly can be determined to have arisen in the quantity of heat to be applied or a thermal conductivity characteristic. The rates of temporal changes employed in the present embodiment signify temperature changes or voltage changes per unit time or at predetermined time intervals; particularly, the changes arising during a predetermined period of time since initiation of heating, and does not necessarily mean a time derivative.

Next, the configuration of the battery ECU 20 of the present embodiment will be further described by reference to FIG. 2. FIG. 2 is a view showing a functional block used for describing the configuration of the battery ECU 20 of the present embodiment.

A voltage measurement section 22 measures a voltage appearing at a terminal of the secondary battery 30. In the present embodiment, the voltage measurement section 22 measures terminal voltages V(1) to V(20) of the battery blocks B1 to B20. The voltage measurement section 22 generates voltage data used for specifying the terminal voltages V(1) to V(20), and outputs the thus-generated voltage data to the temperature control section 26. The voltage measurement section 22 outputs voltage data to the temperature control section 26 at a preset frequency, and the temperature control section 26 stores the voltage data into a storage section 28. When the terminal voltages V(1) to V(N) measured by the voltage measurement section 22 do not need to be distinguished from each other, the voltages are generically expressed as a voltage Vn. The voltage Vn measured by the voltage measurement section 22 is an open circuit voltage (OCV) which is a terminal voltage achieved when no load is connected to the battery blocks.

A temperature measurement section 24 measures the temperature of the secondary battery 40. In the embodiment, analogue signals output from the respective temperature sensors 34 set for the respective groups are converted into digital signals. Temperature data used for specifying the temperature of a battery for each group are generated from the digital signals. The thus-generated temperature data are output to the temperature control section 26. The temperature measurement section 24 outputs temperature data to the temperature control section 26 at a preset frequency, as well. The temperature control section 26 stores the temperature data into the storage section 28.

The temperature control section 26 comprises a voltage change rate detection section 262 and a heat quantity control section 264. The voltage change rate detection section 262 computes a rate of temporal changes (a differential voltage $\Delta V$) of the voltage Vn for each voltage block by reference to the voltage data stored in the storage section 28. The heat quantity control section 264 controls the quantity of heat generated by the heater 36 in accordance with the magnitude of the differential voltage $\Delta V$ of the voltage Vn computed by the voltage change rate detection section 262. More specifically, in a case where the differential voltage $\Delta V$ of the voltage Vn has exceeded a predetermined threshold differential voltage $\Delta Vt$, the heat quantity control section 264 aborts heating of the secondary battery 30 performed by the heater 36 even when the temperature Tm has not yet reached the reference lower-limit temperature Tα.

Subsequently, processing procedures performed when the temperature control section 26 has received a startup command will be further described by reference to a flowchart shown in FIG. 3.

Upon receipt of the startup command output as a result of the user having activated an ignition switch via the vehicle ECU 10 (100), the temperature control section 26 detects voltages V0n of the respective battery blocks divided into the previously-determined groups of battery modules and temperatures T0m of the respective temperature sensors (S102). Subsequently, the temperature control section 26 determines whether or not the lowest temperature (i.e., the lowest temperature T0min) among detected temperatures T0m is lower than the reference lower-limit temperature Tα (S104). When the result of the determination shows that the lowest temperature T0min is higher than or equal to the reference lower-limit temperature Tα (the result of the determination rendered in step S104 is negative [N]), the temperature control section 26 allows the vehicle ECU 10 to perform processing for starting the engine, or the like (S128).

When the lowest temperature T0min is lower than the reference lower-limit temperature Tα (the result of the determination rendered in step S104 is affirmative [Y]), the temperature control section 26 transmits to the heater 36 a heating command showing a predetermined quantity of heat to be applied (S106); and sets a timer used for measuring a heating time (S108). The temperature control section 26 renew detects respective voltages V1n of the respective battery blocks and temperatures T1m of the respective temperature sensors via the voltage measurement section 22 and the temperature measurement section 24 (S110). Subsequently, the temperature control section 26 determines whether or not the lowest temperature (i.e., the lowest temperature T1min) among the detected temperatures T1m is lower than the reference lower-limit temperature Tα (S112). When the result of the determination shows that the lowest temperature T1min is greater than or equal to the reference lower-limit temperature Tα (when the result of the determination rendered in step S112 is negative [N]), the temperature control section 26 transmits a heating stop command to the heater 36 (S126), and allows the vehicle ECU 10 to perform processing for starting the engine, or the like (S128).

Meanwhile, so long as the lowest temperature T1min is lower than the reference lower-limit temperature Tα (when the result of the determination rendered in step S112 is affirmative [Y]), the temperature control section 26 determines whether or not the highest temperature (the highest temperature T1max) among the detected temperatures T1m is lower than the reference upper-limit temperature Tβ (>Tα) that serves as the upper limit for an increase in the temperature of the battery caused by heating (S114). When the result of the determination shows that the highest temperature T1max is greater than or equal to the reference upper-limit temperature Tβ (when the result of the determination rendered in step S114 is negative [N]), the temperature control section 26 transmits the heating stop command to the heater 36 (S126), and allows the vehicle ECU 10 to perform processing for starting the engine or the like (S128).

Meanwhile, so long as the highest temperature T1max is lower than the reference upper-limit temperature Tβ (when the result of the determination rendered in step S114 is affirmative [Y]), the temperature control section 26 computes a differential voltage ΔVn between a previously-detected voltage Vn (i.e., the voltage V0n detected in step S102) and a currently-detected voltage Vn (i.e., the voltage V1n detected in step S110) (S116), thereby determining whether or not the computed differential voltage ΔVn includes any differential voltage which is higher than a predetermined threshold differential voltage ΔVt (S118) When the result of the determination shows that the computed differential voltage ΔVn does not include any differential voltage which is greater than the predetermined threshold differential voltage ΔVt (when the result of the determination rendered in step S118 is negative [N]), the temperature control section 26 determines whether or not heating has been performed for a predetermined period of time or more, on the basis of a timer set in step S108, thereby determining whether or not heating time has elapsed (S120). When the result of the determination shows that the heating time has not yet elapsed (when the result of the determination rendered in S120 is negative [N]), the temperature control section 26 iterates processing pertaining to step S110 and subsequent steps.

When the computed differential voltage ΔVn includes a differential voltage greater than the predetermined threshold differential voltage ΔVt (when the result of the determination rendered in step S118 is affirmative [Y]) or when the heating time has elapsed (when the result of the determination rendered in step S120 is affirmative [Y]), the temperature control section 26 transmits the heating stop command to the heater 36 in order to abort heating of the secondary battery 30 performed by the heater 36 (S122); further prohibits the vehicle ECU 10 from performing startup processing (S124); and, for instance, informs the user of a startup error.

As mentioned above, according to the present embodiment, when the differential voltage ΔVn includes a differential voltage greater than the predetermined threshold differential voltage ΔVt, the temperature control section 26 determines that variations in the temperature of the battery modules constituting the secondary battery 30 are greater than the reference value, thereby aborting heating of the secondary battery 30 performed by the heater 36. As a result, spreading of variations in the temperature or voltage of the battery can be prevented. As a result of abortion of heating operation and the secondary battery being left unheated, the variations in the temperature or voltage of the battery are diminished by convection or by means of conduction of heat among the battery modules. Therefore, according to the present embodiment, there can be prevented a progress in the deterioration of the secondary battery, which would otherwise be caused when, among the group of single cells or the group of battery modules constituting the secondary battery, some single cells or battery modules become excessively discharged for reasons of the variations in the temperature or voltage of the battery modules.

The embodiment has described the case where the temperature control section 26 determines variations in the voltage of the battery from the differential voltage ΔVn or the rate of temporal changes in the voltage of the battery, to thus determine whether to continue or abort heating operation. However, the temperature control section 26 may also determine variations in the temperature of the battery from the rate of temporal changes in the temperature of the battery, thereby determining whether to continue or abort heating operation.

Figure 4:
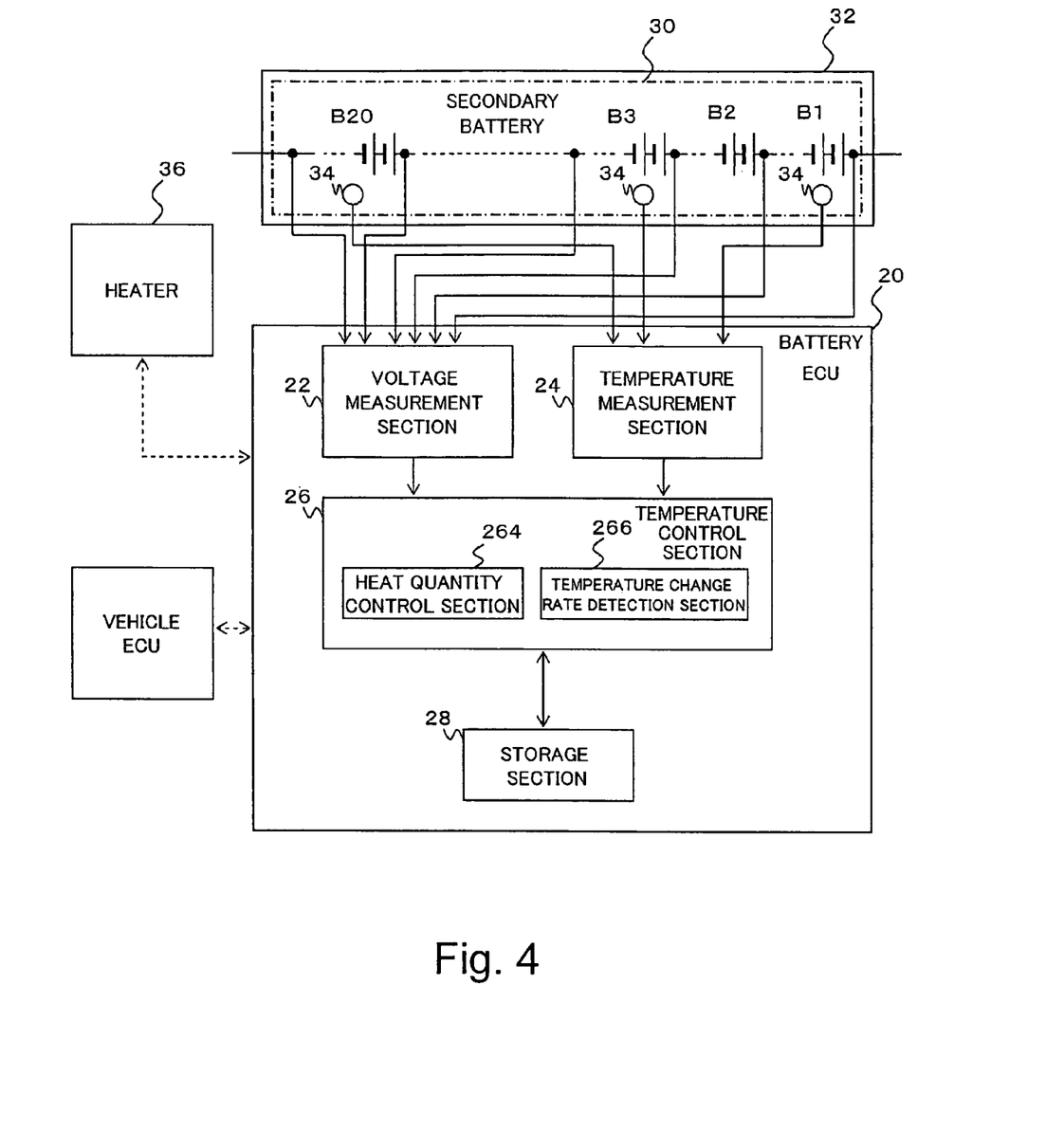
FIG. 4 is a view showing a functional block for describing the configuration of a battery ECU employed when a temperature control section determines variations in battery temperature from a rate of temporal changes in the temperature thereof.

FIG. 4 shows a functional block wherein the temperature control section 26 determines variations in the temperature of the battery on the basis of the rate of temporal changes in the temperature of the battery, thereby determining whether to continue or abort heating operation. The functional block shown in FIG. 4 differs from that shown in FIG. 2 in that the temperature control section 26 has a temperature change rate detection section 266 in lieu of the voltage change rate detection section 262. The temperature change rate detection section 266 computes a rate of temporal changes in the temperature of a battery (a differential temperature ΔTt) for each group.

Figure 5:
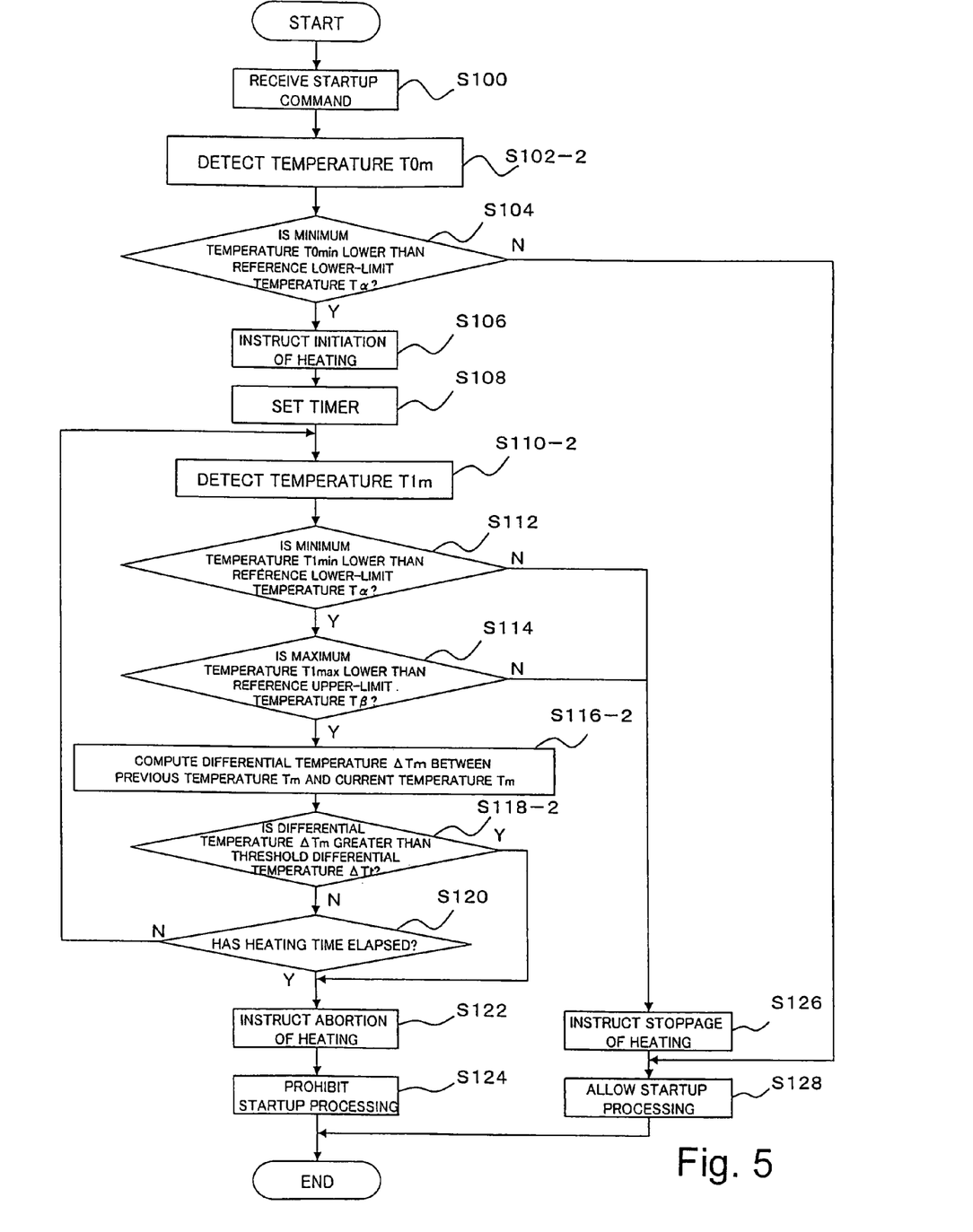
FIG. 5 is a flowchart for describing processing procedures employed when the temperature control section determines variations in the temperature of a battery from a rate of temporal changes in the temperature thereof.

FIG. 5 is a flowchart showing processing procedures employed when the temperature control section 26 determines variations in the temperature of the battery from the rate of temporal changes in the temperature of the battery. The processing procedures of FIG. 5 differ from those shown in FIG. 3 in that in step S118-2 variations in the temperature of a battery are determined from the differential temperature ΔTt.

As mentioned above, even when variations in the temperature of a battery are determined from the rate of temporal changes in the temperature of the battery, there can also be prevented a progress in the deterioration of the secondary battery, which would otherwise be caused when, among the group of single cells or the group of battery modules constituting the secondary battery, some single cells or battery modules become excessively discharged for reasons of variations in the temperature of the battery modules.

The above embodiment has described processing procedures of the temperature control section 26 performed upon receipt of the startup command output as a result of the user having activated the ignition switch. However, the same processing may also apply to processing procedures of the temperature control section 26 performed upon receipt of a stop command output as a result of the user having deactivated the ignition switch. Therefore, in relation to processing procedures of the temperature control section 26 performed at the time of receipt of the stop command, reference is desirably made to the flowcharts shown in FIGS. 3 and 5 while the term "startup" is replaced with the term "stop," as required.

The above descriptions are given to the example where, when variations have arisen in the temperature or voltage of the battery, the temperature control section 26 transmits a heating stop command to the heater 36. However, the temperature control section 26 may instruct the heater 36 to heat the secondary battery 30 with a quantity of heat which is smaller than that required at the time of initiation of heating operation. Moreover, when the variations in the voltage or temperature of the battery are not diminished in spite of the quantity of heat having been reduced, the temperature control section 26 may transmit a heating stop command. Further, the temperature control section 26 may instruct the heater 36 such that the quantity of heat is reduced stepwise until the variations in the voltage or temperature of the battery are reduced.

Figure 3:
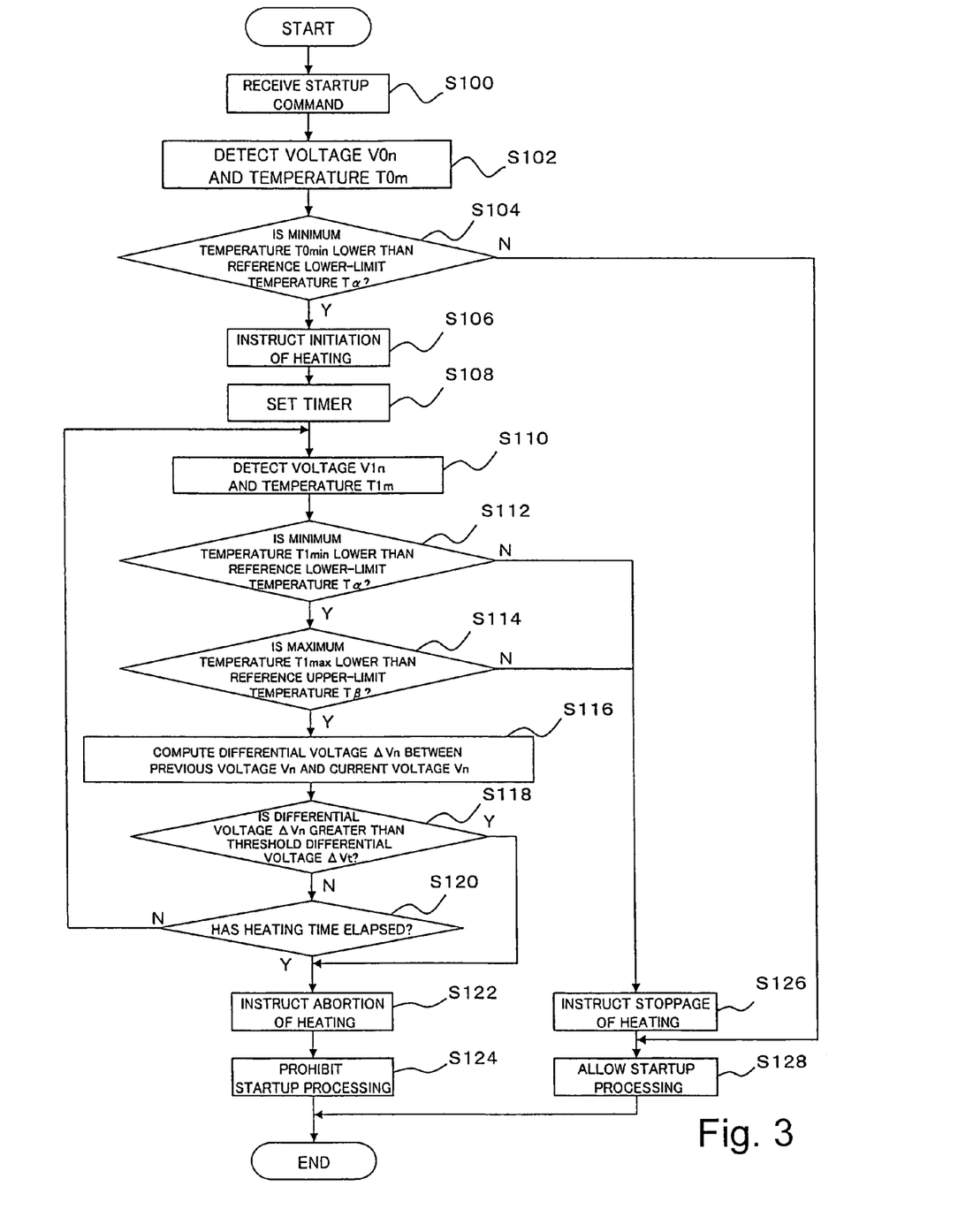
FIG. 3 is a flow chart for describing processing procedures employed when the temperature control section determines variations in the temperature of a battery from a rate of temporal voltage changes.

In the above descriptions, the battery ECU 20 can be embodied by means of installing in a microcomputer a program which implements various processing operations shown in FIGS. 3 and 5, and causing the program to run. In this case, a central processing unit (CPU) of the microcomputer functions as the temperature control section 26.

The above descriptions have mentioned the configuration wherein the battery ECU 20 has the temperature control section 26. However, another ECU, such as the vehicle ECU 10, may have the temperature control section 26, or an ECU dedicated to the temperature control section 26 may be provided separately.

What is claimed is:

1. A vehicle battery pack equipped with a temperature controller for a secondary battery, comprising:
    a heating device for heating a secondary battery formed by combination of a plurality of battery modules;
    a temperature detection section for detecting a temperature of the secondary battery;
    a voltage change detection section for detecting the change in an open circuit voltage of the secondary battery within a predetermined period of time wherein a voltage change represents a differential value in voltage of a previously detected voltage and a currently detected voltage; and
    a heat quantity control section for activating the heating device when a temperature detected by the temperature detection section at the time of startup of the vehicle is a predetermined reference lower-limit temperature required for the secondary battery to exhibit desired recharging-and-discharging capability or less and for suppressing heating operation of the heating device when the voltage change exceeds an allowable value in accordance with the voltage change detected by the voltage change detection section after the heating device has performed heating.

2. The vehicle battery pack equipped with the temperature controller for a secondary battery according to claim 1, wherein the voltage change detection section is for detecting, for every predetermined group of battery modules, the change in the open circuit voltage within a predetermined period of time; and
    the heat quantity control section suppresses and controls heating operation of the heating device when any of the amounts of voltage changes detected every predetermined group of battery modules exceeds the allowable value.

3. The vehicle battery pack equipped with the temperature controller for a secondary battery according to claim 1, wherein the heat quantity control section stops heating operation of the heating device without regard to a relationship between the temperature and the reference lower-limit temperature when the voltage change exceeds the allowable value.

4. The vehicle battery pack equipped with the temperature controller for a secondary battery according to claim 1, wherein, when the amount of voltage change does not exceed the allowable value, the heat quantity control section stops heating operation of the heating device when the temperature does not fall in excess of the reference lower-limit temperature after elapse of a predetermined period of time after heating operation of the heating device.

5. A vehicle battery pack equipped with a temperature controller for a secondary battery, comprising:
    a heating device for heating a secondary battery formed by combination of a plurality of battery modules;
    a temperature detection section for detecting a temperature of the secondary battery; and
    a heat quantity control section for the heating device to operate when the temperature detected by the temperature detection section at the time of startup of the vehicle is lower than or equal to a predetermined reference lower-limit temperature required for the secondary battery to exhibit desired recharging-and-discharging capability and suppressing the heating operation of the heating device when a temperature change between a previous temperature and the temperature detected by the temperature detection section exceeds an allowable threshold differential temperature within a predetermined period of time after starting of the heating operation of the heating device.

6. The vehicle battery pack equipped with a temperature controller for a secondary battery according to claim 5, wherein the temperature detection section detects temperatures of the plurality of battery modules; and
    the heat quantity control section suppresses heating operation of the heating device when any of the temperature changes in the plurality of battery modules exceeds the allowable value.

7. The vehicle battery pack equipped with a temperature controller for a secondary battery according to claim 5, wherein the heat quantity control section stops heating operation of the heating device regardless of a relationship between the temperature and the reference lower-limit value when the temperature change exceeds the allowable value.

8. The vehicle battery pack equipped with a temperature controller for a secondary battery according to claim 5, wherein the heat quantity control section stops heating operation of the heating device when the temperature change does not exceed the allowable value and when the temperature does not fall in excess of the reference lower-limit temperature after elapse of a predetermined period of time after heating operation of the heating device.

* * * * *